US012201155B2

(12) United States Patent
Batista et al.

(10) Patent No.: US 12,201,155 B2
(45) Date of Patent: Jan. 21, 2025

(54) AEROSOL-GENERATING DEVICE WITH SLIDING CONTACTS FOR INDUCTION COIL

(71) Applicant: Philip Morris Products S.A., Neuchatel (CH)

(72) Inventors: Rui Nuno Batista, Neuchatel (CH); Ricardo Cali, Mannheim (DE); Toney Moses Rajan, Mannheim (DE); Alexandra Sereda, Neuchatel (CH)

(73) Assignee: Philip Morris Products S.A., Neuchatel (CH)

( * ) Notice: Subject to any disclaimer, the term of this patent is extended or adjusted under 35 U.S.C. 154(b) by 275 days.

(21) Appl. No.: 17/998,180

(22) PCT Filed: May 7, 2021

(86) PCT No.: PCT/EP2021/062123
§ 371 (c)(1),
(2) Date: Nov. 8, 2022

(87) PCT Pub. No.: WO2021/228704
PCT Pub. Date: Nov. 18, 2021

(65) Prior Publication Data

US 2023/0210184 A1 Jul. 6, 2023

(30) Foreign Application Priority Data

May 14, 2020 (EP) .................................... 20174669

(51) Int. Cl.
*A24F 40/465* (2020.01)
*A24F 40/20* (2020.01)
(Continued)

(52) U.S. Cl.
CPC ............ *A24F 40/465* (2020.01); *A24F 40/20* (2020.01); *A24F 40/57* (2020.01); *H05B 6/108* (2013.01); *H05B 6/36* (2013.01)

(58) Field of Classification Search
None
See application file for complete search history.

(56) References Cited

U.S. PATENT DOCUMENTS 5,095,921 A 3/1992 Losee et al.
2019/0053541 A1 2/2019 Rojo-Calderon
(Continued)

FOREIGN PATENT DOCUMENTS

CN 104095293 B 8/2016
EP 0 488 488 A1 6/1992
(Continued)

OTHER PUBLICATIONS

Japanese Office Action issued Nov. 9, 2023 in Japanese Patent Application No. 2022-563042 (submitting English Translation only), 3 pages.
(Continued)

*Primary Examiner* — Phu H Nguyen
(74) *Attorney, Agent, or Firm* — Oblon, McClelland, Maier & Neustadt, L.L.P.

(57) ABSTRACT

An aerosol-generating device is provided, including: a heating arrangement including an induction coil, a first sliding arrangement including a first contact, the first sliding arrangement being arranged adjacent to the induction coil of the heating arrangement and being configured to slide parallel to a longitudinal axis of the induction coil, and the first contact being mounted on the first sliding arrangement and being arranged to contact the induction coil; and a second sliding arrangement including a second contact, the second sliding arrangement being arranged adjacent to the induction
(Continued)

coil of the heating arrangement and being configured to slide parallel to a longitudinal axis of the induction coil, and the second contact being mounted on the second sliding arrangement and being arranged to contact the induction coil, in which alternating current is supplied to the induction coil between the first contact and the second contact.

18 Claims, 4 Drawing Sheets

(51) Int. Cl.

| | |
|---|---|
| ***A24F 40/57*** | (2020.01) |
| ***H05B 6/10*** | (2006.01) |
| ***H05B 6/36*** | (2006.01) |

(56) References Cited

U.S. PATENT DOCUMENTS

| | | | |
|---|---|---|---|
| 2019/0124988 | A1 | 5/2019 | Hu et al. |
| 2019/0289908 | A1 | 9/2019 | Worm et al. |

FOREIGN PATENT DOCUMENTS

| | | | |
|---|---|---|---|
| EP | 3 476 231 | A1 | 5/2019 |
| JP | S 57-176706 | A | 10/1982 |
| JP | S 58-145211 | A | 8/1983 |
| JP | 2018-536397 | A | 12/2018 |
| JP | 2019-110895 | A | 7/2019 |
| RU | 2 687 765 | C1 | 5/2019 |
| RU | 2 694 283 | C1 | 7/2019 |
| RU | 2018 118 563 | A | 11/2019 |
| WO | WO 2017/068098 | A1 | 4/2017 |
| WO | WO 2019/180593 | A1 | 9/2019 |

OTHER PUBLICATIONS

Russian Search Report issued May 17, 2023 in Russian Patent Application No. 2022132481/07 (with English Translation), 4 pages.

International Search Report & Written Opinion issued Aug. 6, 2021 in PCT/EP2021/062123, filed on May 7, 2021, 15 pages.

Japanese Office Action dated Mar. 4, 2024 in corresponding Japanese Patent Application No. 2022-563042 (with English translation), 7 pages.

International Preliminary Report on Patentability and Written Opinion issued Nov. 24, 2022 in PCT/EP2021/062123, 8 pages.

AEROSOL-GENERATING DEVICE WITH SLIDING CONTACTS FOR INDUCTION COIL

The present invention relates to an aerosol-generating device.

It is known to provide an aerosol-generating device for generating an inhalable vapor. Such devices may heat aerosol-forming substrate to a temperature at which one or more components of the aerosol-forming substrate are volatilised without burning the aerosol-forming substrate. Aerosol-forming substrate may be provided as part of an aerosol-generating article. The aerosol-generating article may have a rod shape for insertion of the aerosol-generating article into a cavity, such as a heating chamber, of the aerosol-generating device. A heating element may be arranged in or around the heating chamber for heating the aerosol-forming substrate once the aerosol-generating article is inserted into the heating chamber of the aerosol-generating device. The heating arrangement may be an induction heating arrangement and comprise an induction coil and a susceptor.

It would be desirable to provide an aerosol-generating device with variable heating of the aerosol-forming substrate of the aerosol-generating article. It would be desirable to provide an aerosol-generating device with variable heating zones. It would be desirable to provide an aerosol-generating device with switchable heating zones. It would be desirable to provide an aerosol-generating device with the option of heating zones or of having a uniform heating of the aerosol-forming substrate of the aerosol-generating article.

According to an embodiment of the invention there is provided an aerosol-generating device. The aerosol-generating article comprises a heating arrangement. The heating arrangement comprises an induction coil. The aerosol-generating device further comprises a first sliding arrangement. The first sliding arrangement comprises a first contact. The first sliding arrangement is arranged adjacent to the induction coil of the heating arrangement and configured to slide parallel to a longitudinal axis of the induction coil. The first contact is mounted on the first sliding arrangement and arranged to contact the induction coil. The aerosol-generating device further comprises a second sliding arrangement. The second sliding arrangement comprises a second contact. The second sliding arrangement is arranged adjacent to the induction coil of the heating arrangement and configured to slide parallel to a longitudinal axis of the induction coil. The second contact is mounted on the second sliding arrangement and arranged to contact the induction coil. An Alternating electrical Current (AC) is supplied to the induction coil between the first contact and the second contact.

According to an embodiment of the invention there may be provided an aerosol-generating device. The aerosol-generating article may comprise a heating arrangement. The heating arrangement may comprise an induction coil. The aerosol-generating device may further comprise a first sliding arrangement. The first sliding arrangement may comprise a first contact. The first sliding arrangement may be arranged adjacent to the induction coil of the heating arrangement and configured to slide parallel to a longitudinal axis be of the induction coil. The first contact may be mounted on the first sliding arrangement and arranged to contact the induction coil. The aerosol-generating device may further comprise a second sliding arrangement. The second sliding arrangement may comprise a second contact. The second sliding arrangement may be arranged adjacent to the induction coil of the heating arrangement and configured to slide parallel to a longitudinal axis be of the induction coil. The second contact may be mounted on the second sliding arrangement and arranged to contact the induction coil. Alternating current may be supplied to the induction coil between the first contact and the second contact.

By providing the two contacts for the induction coil on respective sliding arrangements, alternating current can be supplied to parts of the induction coil. As a consequence, the part of the induction coil operated can be chosen as appropriate. The part of the operated induction coil along the longitudinal length can be changed. Further, the length of the operated induction coil can be changed. Due to these variable contacts, a desirable heating zone within the aerosol-generating device can be created by contacting the induction coil appropriately.

The first contact may establish a first electrical contact point for supplying alternating current to the induction coil. The second contact may establish a second electrical contact point so that an alternating current can run through the induction coil between the first contact and the second contacts.

The distance between the first contact and the second contact is preferably less than the longitudinal length of the induction coil at all times. As a consequence, the heating zone generated within a cavity of the aerosol-generating device as the area surrounded by the portion of the induction coil between the first and the second contacts is smaller than the total area of the cavity surrounded by the induction coil. The cavity of the aerosol-generating device is configured for receiving the aerosol-forming article comprising the aerosol-forming substrate. This enables the aerosol-forming substrate of an aerosol-generating article inserted into the cavity of the aerosol-generating device to be heated according to a preferred heating regime. Particularly, the heating regime comprises heating only a portion of the aerosol-forming substrate at a time.

The heating zone may be created by the area of the cavity that may be surrounded by the part of the induction coil between the first and second contacts.

One or both of the axial length and the axial placement of the heating zone may be adaptable by sliding one or both of the first sliding arrangement and the second sliding arrangement.

The sliding arrangements may be at least partly electrically conductive. This may enable supply of alternating current to the contacts via the sliding arrangements. The aerosol-generating device may further comprise a controller. The controller may be electrically connected with the sliding arrangements. The controller may be electrically connected with the first contact via the first sliding arrangement. The controller may be electrically connected with the second contact via the second sliding arrangement. The electrical contacts or the controller may be electrically connected with a power supply such as a battery as described in more detail herein.

The controller may be configured to control supply of alternating current to the heating arrangement. The controller may be configured to control supply of alternating current to the induction coil of the heating arrangement. The controller may be configured to control supply of alternating current to the induction coil for a predetermined time.

The controller may be configured to control the sliding movement of the sliding arrangements. The controller may be configured to control the sliding movement of the first sliding arrangement. The controller may be configured to control the sliding movement of the second sliding arrangement. The controller may be configured to control the sliding movement of the two sliding arrangements independently of each other. By controlling the sliding movement of the sliding arrangements, the controller may control the distance between the first contact and the second contact. By controlling the distance between the first contact and the second contact, the controller may control the portion of the induction coil that is operated. Exemplarily, the controller may control the first sliding arrangement to slide in a distal direction of the induction coil, while the second sliding arrangement is not moved. In this instance, the distance between the first contact and the second contact will increase. When the controller supplies alternating current between the first contact at the second contact through the induction coil, a larger portion of the induction coil will consequently be operated.

The controller may control movement of the sliding arrangements at the same time. As a consequence, the controller may control movement of the first and second contact at the same time. The controller may move the first and second contacts parallel to each other so that the first and second contacts have the same distance to each other during movement of these contacts. This operation may be beneficial, if different parts of the induction coil are to be operated. The controller may be configured to move the first and second contacts for a predetermined distance and then to supply alternating current between the first and second contacts through the induction coil. This embodiment may be beneficial if different parts of the induction coil are to be operated subsequently. Exemplarily, the induction coil may be divided in different parts, wherein each part corresponds to the distance between the first and the second contact. The first part corresponding to a first heating zone of the induction coil may then be operated. Subsequently, the controller may move the contacts such that a second part corresponding to the second heating zone is heated. These parts of the induction coil may be arranged directly adjacent to each other.

Alternatively or additionally, the controller may be configured to move the contacts steadily along the induction coil. The controller may be configured to supply electrical current to the contacts and through the induction coil at all times or at least for time periods. In this embodiment, the heating zone may gradually move along the induction coil.

One or both of the sliding arrangements may be longitudinal. One or both of the sliding arrangements may be arranged parallel to the longitudinal axis of the cavity. One or both of the sliding arrangements may be arranged parallel to the heating arrangement. One or both of the sliding arrangements may be rod-shaped.

The aerosol-generating device may further comprise a first motor, preferably an electric linear motor. The first motor may be operationally coupled with one or both of the first sliding arrangement and the second sliding arrangement to facilitate the sliding movement of one or both of the first sliding arrangement and the second sliding arrangement. Preferably, the first motor is configured for moving the first sliding arrangement separately from the second sliding arrangement.

The aerosol-generating device may further comprise a second motor, preferably an electric linear motor. The second motor may be operationally coupled with one of the first sliding arrangement and the second sliding arrangement to facilitate the sliding movement of one of the first sliding arrangement and the second sliding arrangement. The first motor may be configured to facilitate the sliding movement of the other of the first sliding arrangement and the second sliding arrangement. Preferably, the second motor is configured for moving the second sliding arrangement separately from the first sliding arrangement.

One or both of the first motor and the second motor may only be operated unidirectionally during one operation cycle of the aerosol-generating device. One operation cycle of the aerosol-generating device corresponds to the process of depleting a fresh aerosol-generating article. In this way, the aerosol-forming substrate of an aerosol-generating article inserted into a cavity of the aerosol-generating device may be uniformly heated starting from one end of the aerosol-forming substrate to the other end of the aerosol-forming substrate. No portion of the aerosol-forming substrate is in this case be heated twice or for a time longer than the desired time for heating this portion of the aerosol-forming substrate.

The controller may be configured to control operation of the motor or of the two motors. A change of shape of the heating zone of the heating arrangement may be facilitated by the controller operating movement of one or both of the sliding arrangements by operation of the motor or the motors.

Each contact may be securely mounted on the sliding arrangement. In other words, each contact may be mounted on the sliding arrangement such that the contact is fixed on the sliding arrangement. The sliding arrangement may be configured to slide in the axial direction of the sliding arrangement. The axial direction of the sliding arrangement may be parallel to the longitudinal axis of the cavity. The longitudinal axis of the cavity may be identical or parallel to the longitudinal axis of the heating arrangement.

One or both of the first contact and the second contact may be configured as sliding contacts. Each sliding contact is configured to electrically contact the induction coil of the heating arrangement.

The aerosol-generating device may further comprise a communication interface for controlling the operation of the controller.

The communication interface may be configured as a button or as a wireless communication interface for communicating with an external device. The external device may be a smartphone, smartwatch of tablet. The communication interface may be configured as a display. The communication interface may be configured as a touch display. The communication interface may comprise a wireless technology to enable communication of the communication interface with the external device. The communication interface may be configured as or comprise a button. By means of the communication interface, a user may control operation of the controller. Exemplarily, a user may control operation of the movement of the sliding arrangements. As a consequence, a user may change the size of the heating zone within the heating arrangement.

Alternatively, operation of the controller may depend upon a predetermined program. This predetermined program may correspond to a desired heating profile of the aerosol-forming substrate of the aerosol-generating article. A user may choose the desired heating profile through the communication interface. Alternatively, the desired heating profile may be predetermined. As a further alternative or additionally, the desired heating profile may depend upon the type of aerosol-generating article received in the cavity. A user may input the type of aerosol-generating article or the type of aerosol-generating article may be detected by the aerosol-generating device and an appropriate heating profile may be chosen as a function of the detected type of aerosol-generating article.

The first sliding arrangement may be electrically isolated from the second sliding arrangement.

The first sliding arrangement may be mechanically coupled to the second sliding arrangement so that the first and second sliding arrangements are moved together. The first sliding arrangement and the second sliding arrangement may even be configured as an integrally formed sliding arrangement, namely as a single sliding arrangement. In this embodiment, a single motor is preferably configured for moving the sliding arrangements. This embodiment is particularly suited if the longitudinal size of the heating zone should remain constant. This embodiment is particularly suited if the aerosol-forming substrate of the aerosol-generating article should be uniformly heated over time, wherein only a portion of the aerosol-forming substrate is heated at a certain time.

The first sliding arrangement may be configured to mechanically independently slide from the second sliding arrangement. In this case, preferably two individual motors are provided for moving the sliding arrangements individually.

The aerosol-generating device may further comprise a first slider actuator mechanically coupled to the first sliding arrangement and configured such that a user can manually slide the first sliding arrangement by means of operating the first slider actuator.

The first slider actuator may be further mechanically coupled to the second sliding arrangement and configured such that a user can manually slide the first sliding arrangement and the second sliding arrangement together by means of operating the first slider actuator.

The aerosol-generating device may further comprise a second slider actuator mechanically coupled to the second sliding arrangement and configured such that a user can manually slide the second sliding arrangement by means of operating the second slider actuator, and wherein the first slider actuator and the second slider actuator are mechanically independent from each other.

One or both of the first slider actuator and the second slider actuator may only be operated unidirectionally during one operation cycle of the aerosol-generating device.

The heating arrangement may comprise a susceptor. The susceptor may be arranged within the cavity or surrounding the cavity. The susceptor may be pin-shaped. The susceptor may be blade-shaped. If the susceptor is pin or blade-shaped, the susceptor is preferably arranged centrally within the cavity of the aerosol generating device. If an aerosol-generating article is inserted into the cavity of the aerosol-generating device, the susceptor may then penetrate into the aerosol-forming substrate of the aerosol-generating article.

Alternatively or additionally, the susceptor may be arranged at least partly surrounding the cavity of the aerosol-generating device. The susceptor may fully surround the cavity of the aerosol-generating device. The inner diameter of such a susceptor arrangement may correspond to or be slightly smaller than the outer diameter of an aerosol-generating article to be received within the cavity. If the aerosol-generating article is inserted into the cavity, the outer circumference of the aerosol-generating article may contact the susceptor. Consequently, the susceptor may hold the aerosol-generating article in the cavity. The susceptor may form the inner wall of the cavity.

The susceptor may be configured as a single susceptor. Alternatively, the susceptor may comprise susceptor segments. Individual susceptor segments may be electrically isolated from each other by insulating layers or by insulating portions. The individual susceptor segments may correspond to preferred positions of the first and second contacts. In other words, the individual susceptor segments may correspond to desired heating zones. The longitudinal length of the individual susceptor segments may be corresponds of the distance between the first contact at the second contact.

The aerosol-generating device may comprise electric circuitry. The electric circuitry may comprise a microprocessor, which may be a programmable microprocessor. The microprocessor may be part of the controller. The electric circuitry may comprise further electronic components. The electric circuitry may be configured to regulate a supply of power to the heating arrangement. Power may be supplied to the heating arrangement continuously following activation of the aerosol-generating device or may be supplied intermittently, such as on a puff-by-puff basis. The power may be supplied to the heating arrangement in the form of pulses of electrical current. The electric circuitry may be configured to monitor the electrical resistance of the heating arrangement, and preferably to control the supply of power to the heating arrangement dependent on the electrical resistance of the heating arrangement.

The aerosol-generating device may comprise a power supply, typically a battery, within a main body of the aerosol-generating device. In one embodiment, the power supply is a Lithium-ion battery. Alternatively, the power supply may be a Nickel-metal hydride battery, a Nickel cadmium battery, or a Lithium based battery, for example a Lithium-Cobalt, a Lithium-Iron-Phosphate, Lithium Titanate or a Lithium-Polymer battery. As an alternative, the power supply may be another form of charge storage device such as a capacitor. The power supply may require recharging and may have a capacity that enables to store enough energy for one or more usage experiences; for example, the power supply may have sufficient capacity to continuously generate aerosol for a period of around six minutes or for a period of a multiple of six minutes. In another example, the power supply may have sufficient capacity to provide a predetermined number of puffs or discrete activations of the heating arrangement.

As used herein, an ‘aerosol-generating device’ relates to a device that interacts with an aerosol-forming substrate to generate an aerosol. The aerosol-forming substrate may be part of an aerosol-generating article, for example part of a smoking article. An aerosol-generating device may be a smoking device that interacts with an aerosol-forming substrate of an aerosol-generating article to generate an aerosol that is directly inhalable into a user’s lungs thorough the user’s mouth. An aerosol-generating device may be a holder. The device may be an electrically heated smoking device. The aerosol-generating device may comprise a housing, electric circuitry, a power supply, a heating chamber and heating arrangement.

As used herein, the term ‘aerosol-generating article’ refers to an article comprising an aerosol-forming substrate that is capable of releasing volatile compounds that can form an aerosol. For example, an aerosol-generating article may be a smoking article that generates an aerosol that is directly inhalable into a user’s lungs through the user’s mouth. An aerosol-generating article may be disposable.

The heating arrangement is preferably configured as an induction heating arrangement. The induction heating arrangement may comprise an induction coil and a susceptor. In general, a susceptor is a material that is capable of generating heat, when penetrated by an alternating magnetic field. When located in an alternating magnetic field. If the susceptor is conductive, then typically eddy currents are induced by the alternating magnetic field. If the susceptor is magnetic, then typically another effect that contributes to the heating is commonly referred to hysteresis losses. Hysteresis losses occur mainly due to the movement of the magnetic domain blocks within the susceptor, because the magnetic orientation of these will align with the magnetic induction field, which alternates. Another effect contributing to the hysteresis loss is when the magnetic domains will grow or shrink within the susceptor. Commonly all these changes in the susceptor that happen on a nano-scale or below are referred to as "hysteresis losses", because they produce heat in the susceptor. Hence, if the susceptor is both magnetic and electrically conductive, both hysteresis losses and the generation of eddy currents will contribute to the heating of the susceptor. If the susceptor is magnetic, but not conductive, then hysteresis losses will be the only means by which the susceptor will heat, when penetrated by an alternating magnetic field. According to the invention, the susceptor may be electrically conductive or magnetic or both electrically conductive and magnetic. An alternating magnetic field generated by one or several induction coils heat the susceptor, which then transfers the heat to the aerosol-forming substrate, such that an aerosol is formed. The heat transfer may be mainly by conduction of heat. Such a transfer of heat is best, if the susceptor is in close thermal contact with the aerosol-forming substrate.

The invention further relates to a system comprising an aerosol-generating device as described herein and an aerosol-generating article as described herein comprising aerosol-forming substrate as described herein.

Below, there is provided a non-exhaustive list of non-limiting examples. Any one or more of the features of these examples may be combined with any one or more features of another example, embodiment, or aspect described herein.

Example A: Aerosol-generating device comprising:

a heating arrangement comprising an induction coil, a first sliding arrangement comprising a first contact, wherein the first sliding arrangement is arranged adjacent to the induction coil of the heating arrangement and configured to slide parallel to a longitudinal axis of the induction coil, wherein the first contact is mounted on the first sliding arrangement and arranged to contact the induction coil, and a second sliding arrangement comprising a second contact, wherein the second sliding arrangement is arranged adjacent to the induction coil of the heating arrangement and configured to slide parallel to a longitudinal axis of the induction coil, wherein the second contact is mounted on the second sliding arrangement and arranged to contact the induction coil, wherein alternating current is supplied to the induction coil between the first contact and the second contact.

Example B: Aerosol-generating device according to example A, wherein one or both of the first contact and the second contact are configured as sliding contacts.

Example C: Aerosol-generating device according to any of the preceding examples, wherein the aerosol-generating device further comprises a controller, wherein the controller is configured to control supply of alternating current to the induction coil via the first contact and the second contact.

Example D: Aerosol-generating device according to example C, wherein the first sliding arrangement is at least partly electrically conductive and wherein the controller is electrically connected with the first sliding arrangement and the first contact.

Example E: Aerosol-generating device according to example C, wherein the second sliding arrangement is at least partly electrically conductive and wherein the controller is electrically connected with the second sliding arrangement and the second contact.

Example F: Aerosol-generating device according to any of examples C to E, wherein the aerosol-generating device further comprises a communication interface for controlling the operation of the controller.

Example G: Aerosol-generating device according to example F, wherein the communication interface is configured as a button or as a wireless communication interface for communicating with an external device.

Example H: Aerosol-generating device according to any of the preceding examples, wherein the aerosol-generating device further comprises a first motor, preferably an electric linear motor, and wherein the first motor is operationally coupled with one or both of the first sliding arrangement and the second sliding arrangement to facilitate the sliding movement of one or both of the first sliding arrangement and the second sliding arrangement.

Example I: Aerosol-generating device according to example H, wherein the aerosol-generating device further comprises a second motor, preferably an electric linear motor, and wherein the second motor is operationally coupled with one of the first sliding arrangement and the second sliding arrangement to facilitate the sliding movement of one of the first sliding arrangement and the second sliding arrangement, and wherein the first motor is configured to facilitate the sliding movement of the other of the first sliding arrangement and the second sliding arrangement.

Example J: Aerosol-generating device according example H or I, wherein one or both of the first motor and the second motor can only be operated unidirectionally during one operation cycle of the aerosol-generating device.

Example K: Aerosol-generating device according to any of the preceding examples, wherein the first sliding arrangement is electrically isolated from the second sliding arrangement.

Example L: Aerosol-generating device according to any of the preceding examples, wherein the first sliding arrangement is mechanically coupled to the second sliding arrangement so that the first and second sliding arrangements are moved together.

Example M: Aerosol-generating device according to any of examples A to L, wherein the first sliding arrangement is configured to mechanically independently slide from the second sliding arrangement.

Example N: Aerosol-generating device according to any of the preceding examples, wherein the aerosol-generating device further comprises a first slider actuator mechanically coupled to the first sliding arrangement and configured such that a user can manually slide the first sliding arrangement by means of operating the first slider actuator.

Example O: Aerosol-generating device according to example N, wherein the first slider actuator is further mechanically coupled to the second sliding arrangement and configured such that a user can manually slide the first sliding arrangement and the second sliding arrangement together by means of operating the first slider actuator.

Example P: Aerosol-generating device according to example N, wherein the aerosol-generating device further comprises a second slider actuator mechanically coupled to the second sliding arrangement and configured such that a user can manually slide the second sliding arrangement by means of operating the second slider actuator, and wherein the first slider actuator and the second slider actuator are mechanically independent from each other.

Example Q: Aerosol-generating device according to any one of examples N to P, wherein one or both of the first slider actuator and the second slider actuator can only be operated unidirectionally during one operation cycle of the aerosol-generating device.

Example R: Aerosol-generating device according to any of the preceding examples, wherein the aerosol-generating device further comprises a cavity for receiving an aerosol-generating article comprising aerosol-forming substrate.

Example S: Aerosol-generating device according to example R, wherein the induction coil is arranged parallel to the longitudinal axis of the cavity and at least partly surrounding the cavity.

Example T: Aerosol-generating device according to example S, wherein a heating zone is created by the area of the cavity that is surrounded by the part of the induction coil between the first and second contacts.

Example U: Aerosol-generating device according to example T, wherein one or both of the axial length and the axial placement of the heating zone is adaptable by sliding one or both of the first sliding arrangement and the second sliding arrangement.

Example V: System comprising an aerosol-generating device according to any of the preceding examples and an aerosol-generating article comprising aerosol-forming substrate.

Features described in relation to one embodiment may equally be applied to other embodiments of the invention.

The invention will be further described, by way of example only, with reference to the accompanying drawings in which.

Figure 1:
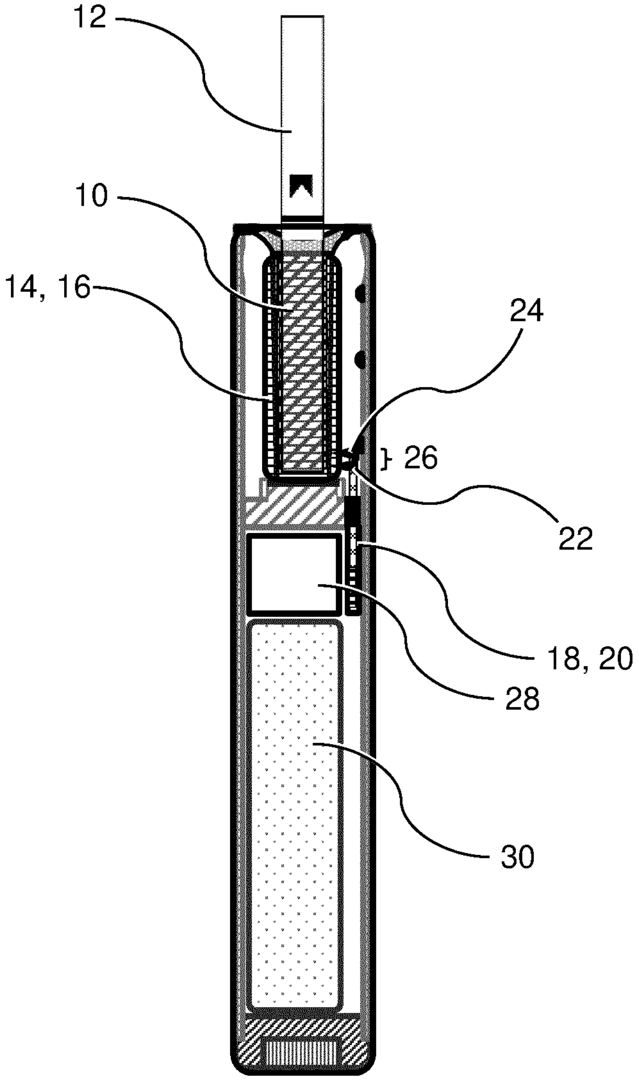
FIG. 1 shows an embodiment of the aerosol-generating device.

FIG. 1 shows an aerosol-generating device. The aerosol-generating device comprises a cavity 10 for receiving an aerosol-generating article 12 comprising aerosol-forming substrate. The cavity 10 is configured as a heating chamber. The cavity 10 has a cylindrical shape. The aerosol-generating article 12 can be inserted into the cavity 10 at a proximal end of the aerosol-generating device.

The aerosol-generating device further comprises a heating arrangement 14. The heating arrangement 14 comprises an induction coil 16 and a susceptor. The susceptor can be configured as an internal susceptor having a pin or blade shape. An internal susceptor is arranged centrally within the cavity 10 and configured for penetrating into the aerosol-forming substrate of the aerosol-generating article 12, when the aerosol-generating article 12 is inserted into the cavity 10. Alternatively or additionally, the susceptor can be configured as an external susceptor surrounding the cavity 10. In any case, the susceptor is arranged within the induction coil 16 such that the induction coil 16 can generate an alternating magnetic field for heating the susceptor.

The aerosol-generating device further comprises a first sliding arrangement 18 and a second sliding arrangement 20. The individual sliding arrangements can be seen in more detail in FIGS. 3 and 4. The first sliding arrangement 18 comprises a first contact 22. The first contact 22 is configured to enable supply of alternating current to the induction coil 16. The first contact 22 establishes an electrical contact point to the induction coil 16. The second sliding arrangement 20 comprises a second contact 24. The second contact 24 is configured to enable supply of alternating current to the induction coil 16. The second contact 24 establishes an electrical contact point to the induction coil 16.

Figure 2:
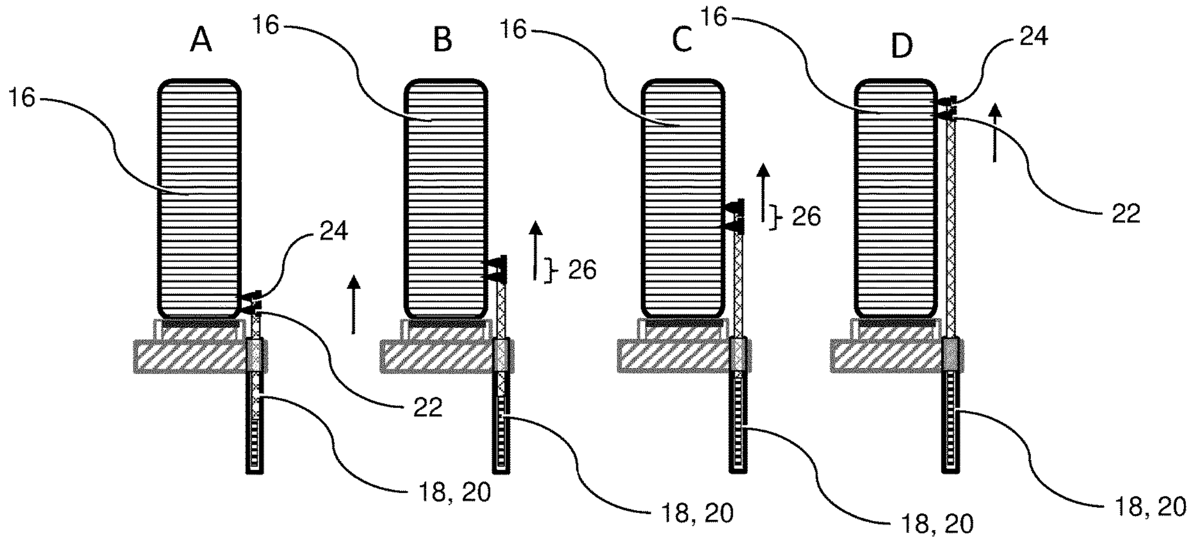
FIG. 2 shows the configuration and the operation of sliding arrangements of the aerosol-generating device.

The first sliding arrangement 18 and the second sliding arrangement 20 may be configured to be moved together. For this reason, the first sliding arrangement 18 and the second sliding arrangement 20 may be fixed together. As can be seen in FIG. 1, in this case the first contact 22 at the second contact 24 have a certain distance to each other. As can be seen in FIG. 2, if the first sliding arrangement 18 and the second sliding arrangement 20 slide, both the first contact 22 and the second contact 24 are moved together and remain distanced from each other with the same distance.

The distance between the first contact 22 and the second contact 24 establishes the longitudinal distance of a heating zone 26. The heating zone 26 is the area of the cavity 10 surrounded by the portion of the induction coil 16 between the first contact 22 at the second contact 24. This portion of the induction coil 16 is operated, when alternating current is supplied between the first contact 22 at the second contact 24. As a consequence, this portion of the induction coil 16 generates an alternating magnetic field to heat the susceptor that is surrounded by this portion of the induction coil 16.

Alternatively or additionally, the first sliding arrangement 18 and the second sliding arrangement 20 may be configured movable independently from each other. In this embodiment, the distance between the first contact 22 at the second contact 24 can be chosen as appropriate. As a consequence, the longitudinal length of the heating zone 26 can be chosen as appropriate.

The aerosol-generating device further comprises a controller 28. The controller 28 is configured to control the supply of alternating current between the first contact 22 and the second contact 24. The controller 28 is electrically connected with the first contact 22 and the second contact 24. The first sliding arrangement 18 is electrically connected with the first contact 22 and with the controller 28 or the first sliding arrangement 18 comprises an electrically conductive portion electrically connected with the first contact 22 and with the controller 28. The second sliding arrangement 20 is electrically connected with the second contact 24 and with the controller 28 or the second sliding arrangement 20 comprises an electrically conductive portion electrically connected with the second contact 24 and with the controller 28. The aerosol-generating device further comprises a battery 30. The controller 28 is configured to control the supply of DC current from the battery 30 to a DC/AC converter that is connected to the first and second contact 24*s*. Hereby the controller operates the heating arrangement 14 by controlling the supply of alternating current to the coil 16. The DC/AC converter is preferably a separate unit.

FIG. 2 shows operation of the heating arrangement 14 in more detail. From FIG. 2A to 2D, the sliding arrangement slides the first contact 22 and the second contact 24 from a distal end of the induction coil 16 to a proximal end of the induction coil 16. As a consequence, the heating zone 26 travels in a proximal direction. In the embodiment shown in FIG. 2, the distance between the first contact 22 and the second contact 24 remains the same. As a consequence, the longitudinal length of the heating zone 26 remains the same.

Figure 3:
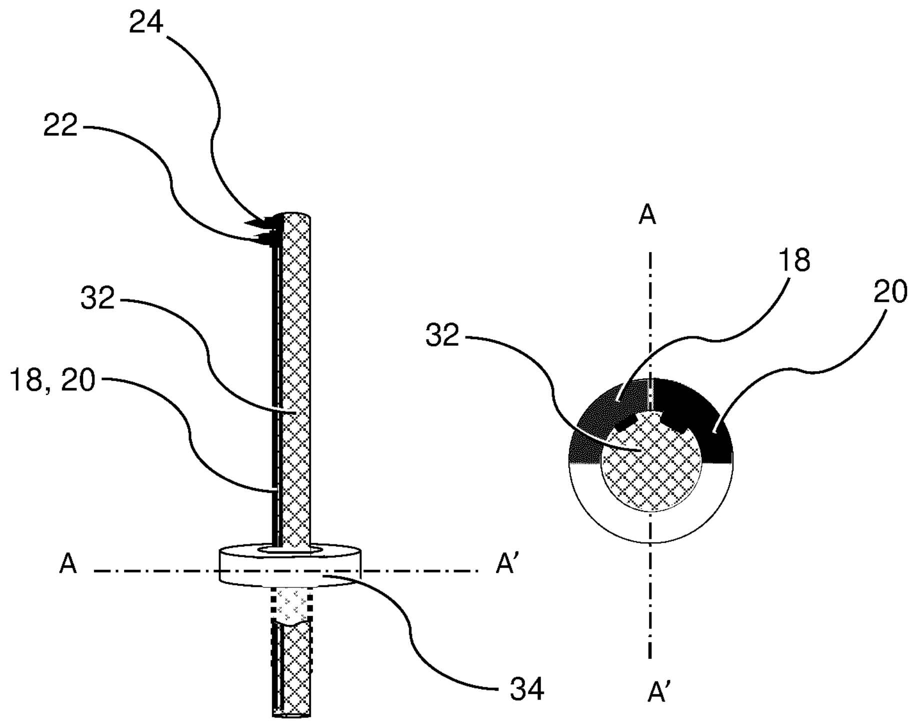
FIG. 3 shows the sliding arrangements from a different perspective.

FIG. 3 shows the first sliding arrangement 18 and the second sliding arrangement 20. The first sliding arrangement 18 and the second sliding arrangement 20 are elongate. The first sliding arrangement 18 and the second sliding arrangement 20 are mounted on a sliding rod 32. The sliding rod 32 is arranged in the aperture of a mounting element 34. This arrangement of the first sliding arrangement 18 and of the second sliding arrangement 20 enables an independent sliding movement of the first sliding arrangement 18 and of the second sliding arrangement 20. As a consequence, the distance between the first contact 22 at the second contact 24 can be controlled by the controller 28. The distance between the first contact 22 at the second contact 24 determines the longitudinal length of the heating zone 26. Thus, independently controlling the first sliding arrangement 18 and the second sliding arrangement 20 enables control of the size of the heating zone 26.

Figure 4:
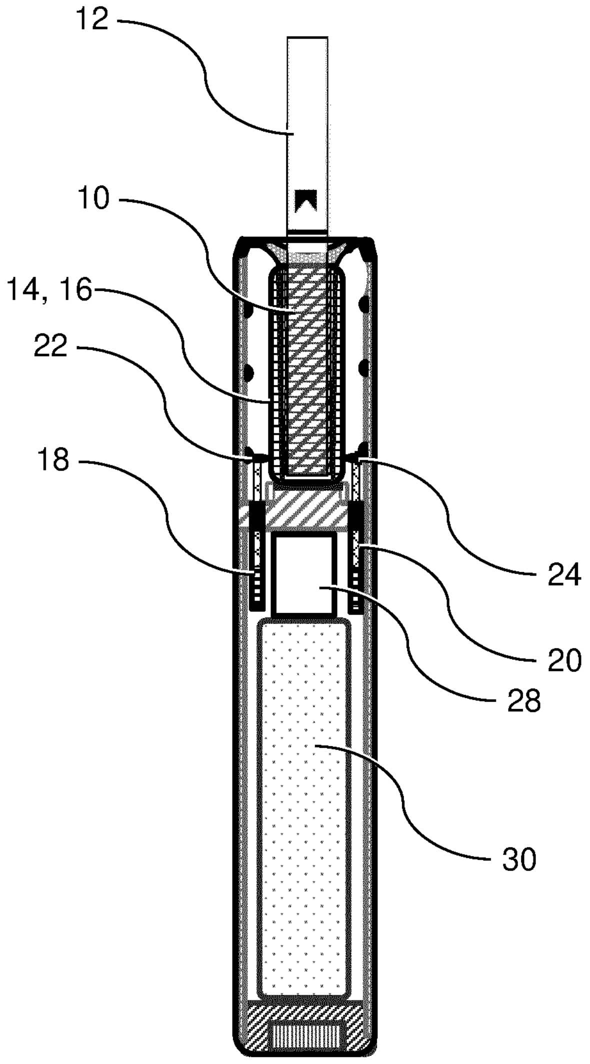
FIG. 4 shows a further embodiment of the aerosol-generating device with the sliding arrangements arranged differently.

FIG. 4 shows an embodiment of the aerosol-generating device with a different arrangement of the first sliding arrangement 18 and the second sliding arrangement 20. In contrast to the embodiment shown in FIG. 1, the first sliding arrangement 18 is arranged on one side of the cavity 10 in the embodiment shown in FIG. 4, and the second sliding arrangement 20 is arranged on the opposite side of the cavity 10. As a consequence, the first contact 22 is arranged opposite of the second contact 24 on an opposite side of the cavity 10.

The invention claimed is:

1. An aerosol-generating device, comprising:

a heating arrangement comprising an induction coil, a first sliding arrangement comprising a first contact, wherein the first sliding arrangement is arranged adjacent to the induction coil of the heating arrangement and is configured to slide parallel to a longitudinal axis of the induction coil, and wherein the first contact is mounted on the first sliding arrangement and is arranged to contact the induction coil; and a second sliding arrangement comprising a second contact, wherein the second sliding arrangement is arranged adjacent to the induction coil of the heating arrangement and is configured to slide parallel to a longitudinal axis of the induction coil, and wherein the second contact is mounted on the second sliding arrangement and is arranged to contact the induction coil, wherein alternating current is supplied to the induction coil between the first contact and the second contact.

2. The aerosol-generating device according to claim 1, wherein one or both of the first contact and the second contact are configured as sliding contacts.

3. The aerosol-generating device according to claim 1, further comprising a controller configured to control supply of alternating current to the induction coil via the first contact and the second contact.

4. The aerosol-generating device according to claim 3, wherein the first sliding arrangement is at least partly electrically conductive, and wherein the controller is electrically connected with the first sliding arrangement and the first contact.

5. The aerosol-generating device according to claim 3, wherein the second sliding arrangement is at least partly electrically conductive, and wherein the controller is electrically connected with the second sliding arrangement and the second contact.

6. The aerosol-generating device according to claim 1, further comprising a first motor, wherein the first motor is operationally coupled with one or both of the first sliding arrangement and the second sliding arrangement to facilitate sliding movement of one or both of the first sliding arrangement and the second sliding arrangement.

7. The aerosol-generating device according to claim 6, wherein the first motor is an electric linear motor.

8. The aerosol-generating device according to claim 6, further comprising a second motor, wherein the second motor is operationally coupled with one of the first sliding arrangement and the second sliding arrangement to facilitate sliding movement of one of the first sliding arrangement and the second sliding arrangement, and wherein the first motor is configured to facilitate sliding movement of the other of the first sliding arrangement and the second sliding arrangement.

9. The aerosol-generating device according to claim 8, wherein the second motor is an electric linear motor.

10. The aerosol-generating device according to claim 8, wherein one or both of the first motor and the second motor can only be operated unidirectionally during one operation cycle of the aerosol-generating device.

11. The aerosol-generating device according to claim 1, wherein the first sliding arrangement is electrically isolated from the second sliding arrangement.

12. The aerosol-generating device according to claim 1, wherein the first sliding arrangement is mechanically coupled to the second sliding arrangement so that the first and the second sliding arrangements are moved together.

13. The aerosol-generating device according to claim 1, wherein the first sliding arrangement is configured to mechanically slide independently from the second sliding arrangement.

14. The aerosol-generating device according to claim 1, further comprising a cavity configured to receive an aerosol-generating article comprising aerosol-forming substrate.

15. The aerosol-generating device according to claim 14, wherein the induction coil is arranged parallel to a longitudinal axis of the cavity and is at least partly surrounding the cavity.

16. The aerosol-generating device according to claim 15, wherein a heating zone is created by an area of the cavity that is surrounded by a part of the induction coil between the first and the second contacts.

17. The aerosol-generating device according to claim 16, wherein one or both of axial length and axial placement of the heating zone is adaptable by sliding one or both of the first sliding arrangement and the second sliding arrangement.

18. A system comprising an aerosol-generating device according to claim 1, and an aerosol-generating article comprising aerosol-forming substrate.

* * * * *